Jan. 21, 1969   N. H. KEYSER   3,423,080
ELECTRIC ARC FURNACE

Filed Nov. 6, 1963

INVENTOR.
NAAMAN H. KEYSER
BY
ATTORNEYS

United States Patent Office 3,423,080
Patented Jan. 21, 1969

3,423,080
ELECTRIC ARC FURNACE
Naaman H. Keyser, Parma, Ohio, assignor to Interlake Steel Corporation, a corporation of New York
Filed Nov. 6, 1963, Ser. No. 321,908
U.S. Cl. 266—10          14 Claims
Int. Cl. F27b 1/08; H05b 7/18

This invention relates generally to a method and apparatus for reducing molten metals, and more particularly to a reduction furnace, such as an electric furnace, blast furnace or other such reduction type furnace and the method for producing ferro alloys, calcium carbide, pig iron and the like in such furnace.

Heretofore, in one type of molten metal reduction, and in particular to top-charge, continuous electric furnace reduction, the charge which generally comprises metal scrap, ore, burnt lime, limestone, and preferred carbonaceous reducing agents are mixed together and charged through the top and into the shaft of the furnace. The electrodes or other such heating means are then energized to generate heat in the furnace to effect the necessary oxidation and reduction operations suitable for reducing the burden. The reaction products of such electric furnace reduction may include ferro chrome, ferro silicon, calcium silicide, calcium carbide and gaseous furnace products of combustion, such as carbon monoxide, which filter up through the burden and which ultimately burn as waste products at the top of the furnace. Heretofore, fifty percent or more of the potential heat that goes into the furnace was wasted through the combustion of such gases at the top of the furnace.

In such electric furnace reduction a considerable amount of electrical energy is required to maintain proper operation of the furnace. Moreover, the power consumption and thus the cost of operation in tons per unit of electrical energy supplied has substantially limited furnace capacity, and thus the efficiency of electric furnace reduction. Heretofore, efforts to reclaim such heat potential and therefore increase the electric furnace reduction efficiency, have resulted in the utilization of roofed furnaces and extensive collective duct regenerating systems for recovering and regenerating the potential heat values from the furnace gases that would otherwise be dissipated to the atmosphere. Such additional recovery facilities are not only expensive in initial cost and installation, but are costly from a maintenance and operational standpoint and also require the utilization of vital floor space for their successful installation and operation. Furthermore, in addition to being a highly inefficient operation, the wasting of such furnace gases to the atmosphere has resulted in extremely hazardous working conditions in the area immediately adjacent the furnaces. Such working condition places a severe hardship on the personnel and limit the proper operation and control for efficient electric furnace reduction.

In another form of molten metal reduction, and in particular to blast furnace reduction, the charge which principally comprises iron ore, limestone and coke is charged through an opening in the top of the furnace and down into the stack, whereby heated air from conventional type pre-heat stoves is blown into the tuyeres at the bottom of the furnace. The heated air reacts with the burden forming gaseous products of combustion, such as carbon monoxide, which gases pass up through the burden and acts to reduce the iron ore descending through the furnace. The reduction is generally continuous except for the periodical removal of impurities, in the form of slag, and of the metal which is poured off through separate openings in the crucible or hearth of the furnace.

The permeability of the central portion of the burden is considerably greater than the surrounding portion of the stock column and thus offers a ready path for the furnace reaction gases, such as carbon monoxide, to filter up through the burden. This has resulted in a relatively high gas velocity and less efficient use of the carbon monoxide gas for reduction purposes. Moreover, in efficient blast furnace operation, it is important to conserve and concentrate the heat within the furnace, however, unreacted gases, such as carbon monoxide, which filter up through the burden drains heat from the vital reducing regions within the furnace and promotes a condition unsatisfactory to efficient blast furnace reduction. Accordingly, it is essential to provide a condition which will conserve and concentrate the greatest amount of heat within the furnace with a minimum loss of waste gases rising through the burden, consistent with the thermal requirement of the furnace.

Accordingly, it is an object of the present invention to provide a more economical and efficient reduction type furnace and method for reducing molten metals.

Another object of the present invention is to provide an improved apparatus and method for introducing an oxidizing media below the surface of the burden, but above the smelting zone in a reduction type furnace, such as in an electric furnace, blast furnace, or other such type of reduction furnace, and in a manner to achieve a more efficient utilization of the reaction products of combustion.

A further object of the present invention is to provide an improved electric reduction furnace and method for recovering the heating values of the reaction products of combustion, so as to eliminate special roofed furnace constructions and/or extensive collective systems for recovering such heating values, and which eliminates the unhealthy and hazardous working conditions theretofore attendant with use of conventional type of electric furnace equipment.

A still further object of the present invention is to provide an improved blast furnace construction and method which will concentrate and conserve greater amounts of heat within the furnace and with a minimum loss of heating values from the reaction products of combustion consistent with the thermal requirements of the furnace.

Further objects and advantages and other new and useful features in the construction, arrangement and general combination of the elements for introducing and oxidizing media into the burden of a reduction type furnace, such as in the electric furnace, blast furnace, or the like, will be apparent to those skilled in the art, as the following description proceeds, with reference to the accompanying drawings, for the purposes of illustration of limitation, wherein like reference characters designate like parts, throughout, wherein.

Figure 5:
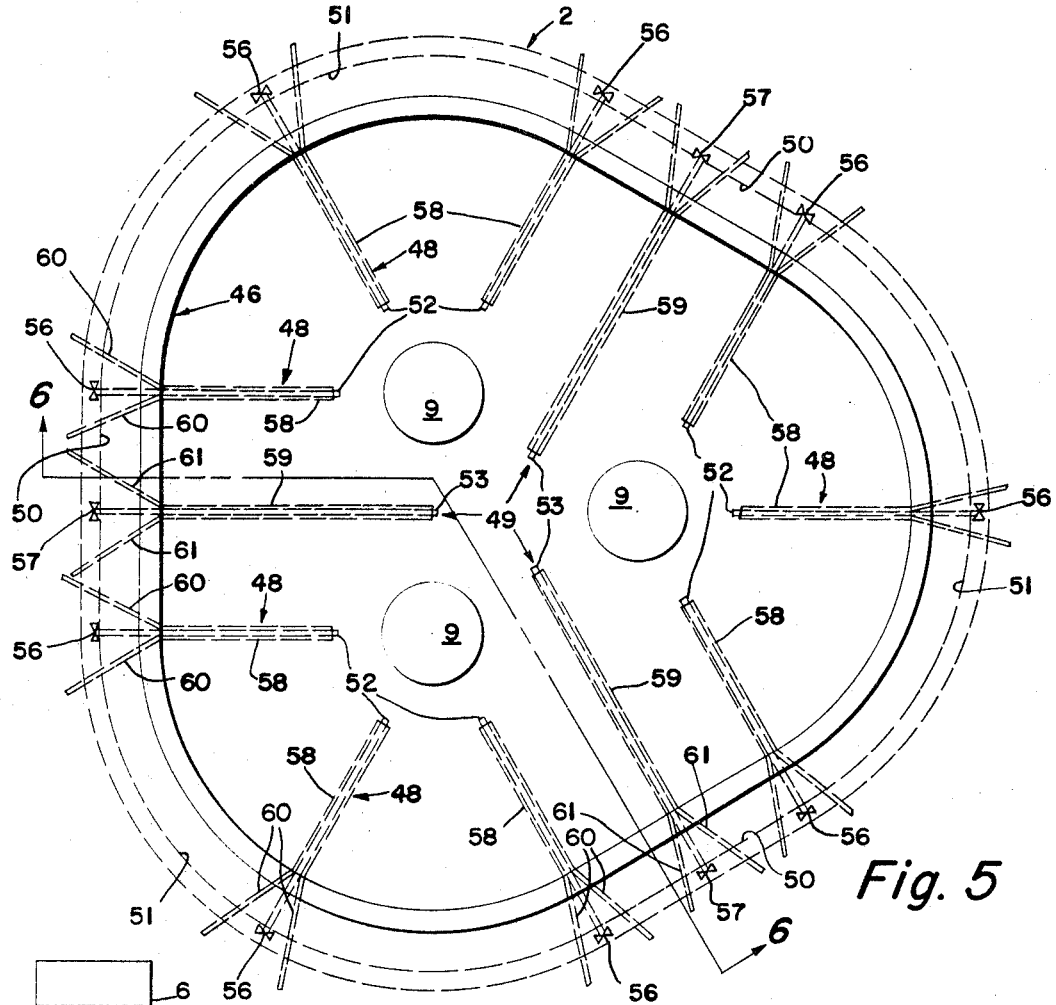
FIG. 5 is a top plan view of yet another form of the improved electric reduction furnace of the present invention.
Figure 6:
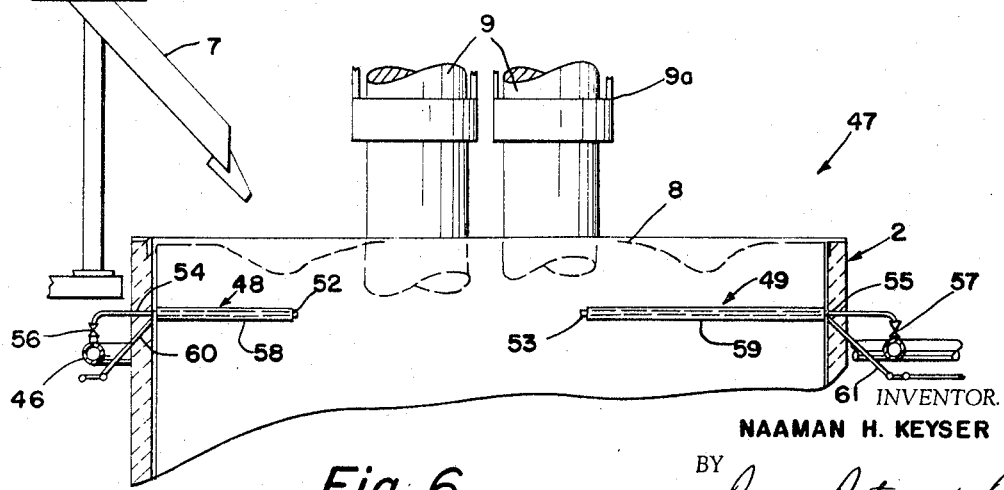
FIG. 6 is a fragmentary cross-section view taken along the plan of line 6—6 of FIG. 5.
Figure 7:
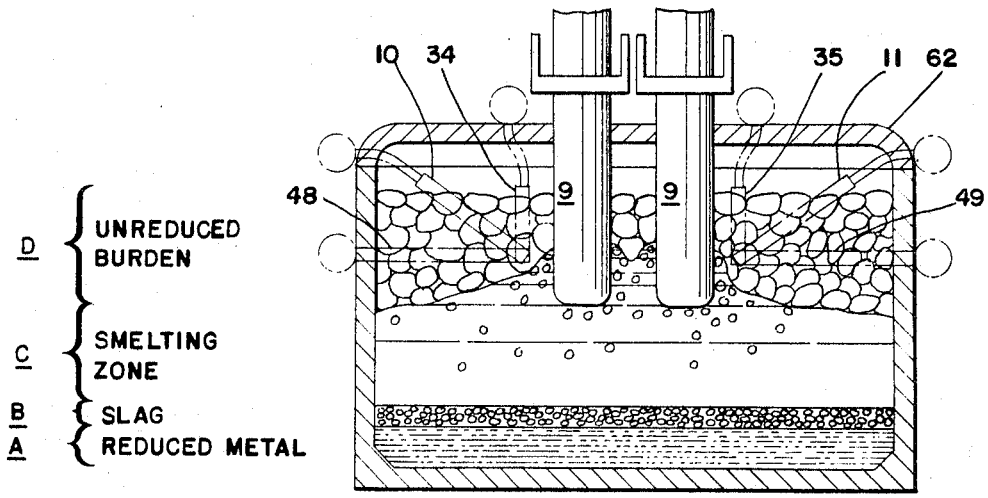
Figure 8:
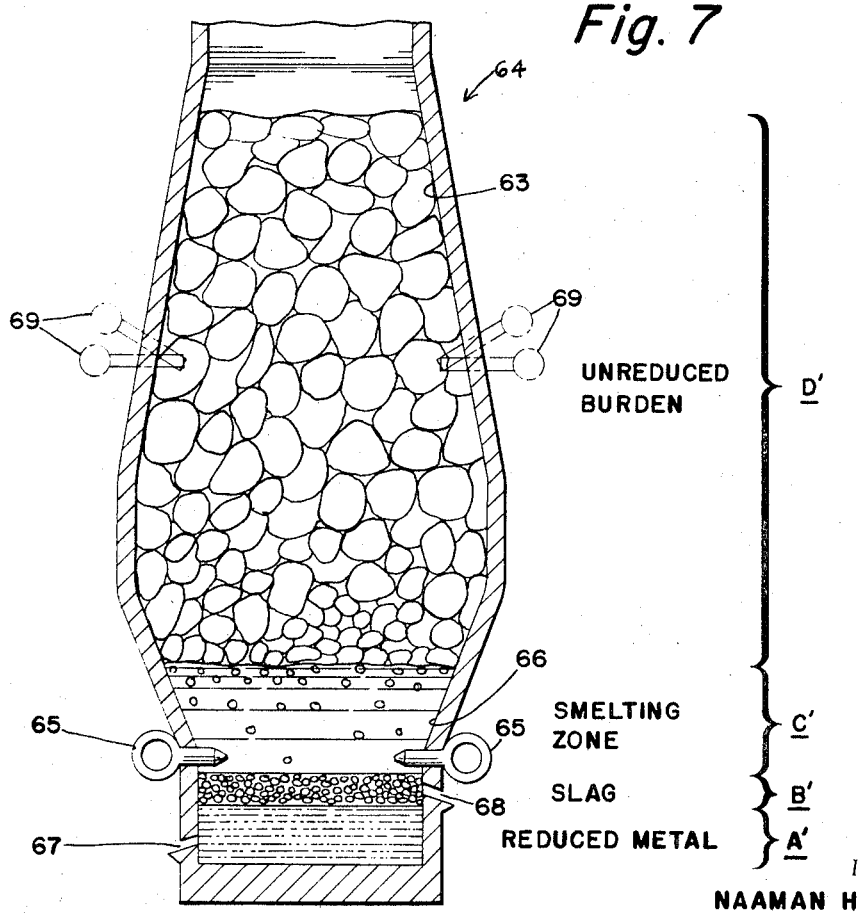

FIG. 7 is a fragmentary cross-sectional view of the improved electric reduction furnace construction of FIGS. 1 to 6, and illustrating diagrammatically the distribution of the burden within the furnace during the reduction process; and FIG. 8 is a fragmentary cross-sectional view of a conventional type blast furnace construction incorporating the improved means of the present invention for introducing an oxidizing media into the furnace, and illustrating diagrammatically the distribution of the burden within the furnace during the reduction process.

Briefly, in accordance with the present invention it has been found that the aforementioned disadvantages of reduction in conventional type reduction furnaces, such as in the electric furnace and the blast furnace, can be successfully and efficiently obviated by introducing an oxidizing media, such as air, oxygen, or other such type of oxygen bearing media, under pressure below the surface of the burden within the furnace. It has been found that by uniformly introducing such oxidizing media and at a predetermined depth below the surface of the burden, that the oxygen bearing ingredients contained therein chemically react within the interstices of the burden with the gaseous reaction products, such as carbon monoxide, which filter up through the furnace. The inter-combustion with the oxidizing ingredients burns off such gaseous reaction products within the furnace, thereby utilizing the heating values which emanate therefrom to the best possible advantage for further reduction purposes.

To the accomplishment of these and other such objects, the charge in one form of the invention may be reduced in a conventional type electric reduction furnace which utilizes for its source of energy a plurality of electrodes disposed within the furnace. The oxidizing media, in one of several modified forms, may then be delivered from a source of supply to a main supply bustle disposed on the furnace. The oxidizing media is discharged under pressure from the bustle through a series of symmetrically arranged, heat-resistant lance members which communicate therewith and which extend therefrom into a predetermined discharging relationship within the furnace, such that the oxidizing media is uniformly distributed and to a predetermined depth within the burden for effective combustion of the gaseous reaction products which emanate up through the furnace.

In another form of the present invention, the charge may be reduced in a conventional type blast furnace construction. Here again, the oxidizing media, such as air, oxygen or other such oxygen bearing media, may be delivered from a source of supply and through a series of symmetrically arranged, heat-resistant lances which extend interiorly within the stack of the furnace, such that the oxidizing media is uniformly distributed and to a predetermined depth within the burden for effective combustion of the gaseous reaction products which emanate up through the stack.

Referring now again to FIGS. 1 to 7 of the drawings, and more particularly to FIGS. 1 and 2 thereof, there is shown one form of the present invention for use with an electric reduction furnace, designated generally at 1. The furnace may take the form of a generally triangularly shaped shell 2 having rounded corner portions and a generally spheroidal or flat bottom (not shown). The shell 2 is of a generally rigid construction which may be made of metal and lined with carbon 4 (cut block or paste) backed up by some refractory material 5, such as fire brick, and insulated to prevent the undue escape of heat therefrom.

Figure 2:
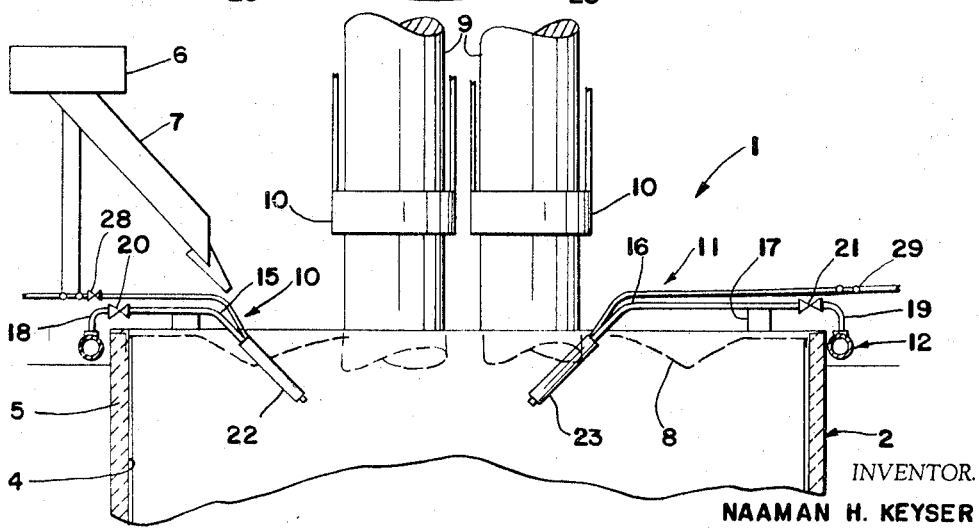
FIG. 2 is a fragmentary cross-sectional view taken along the plane of 2—2 of FIG. 1.

As shown in FIG. 2, the charge which preferably consists of a mixture such as metal scrap, ore, reducing agents, etc., is preferably stored above the furnace in a hopper 6 and may be charged therefrom through the top and into the furnace shaft by means of a chute 7. Additional hoppers (not shown) may be provided to supply the necessary flux or other additions to the furnace.

The electrical energy is preferably changed into heat for reducing the burden 8 by means of three electrodes 9 which may be arranged in triangle within the furnace shell 2. The electrodes may be of a conventional construction comprised of amorphous carbon or graphitic material and may be connected to a suitable source of electrical power (not shown) by means of a conventional type flexible conduit and buss bar arrangement (not shown). The electrodes 9 may be mounted in conventional type electrode holders 10 for movement in a generally vertical direction into and out of the furnace, as known in the art.

In this form of the invention, an oxidizing media, such as air, oxygen or other such type of oxygen bearing media, may be introduced under pressure below the surface of the burden 8 by means of a series of lances 10, 11 which communicate with a supply bustle 12. The bustle 12 may be secured exteriorly to the shell 2 adjacent the upper rim of the furnace and may be of a triangularly shaped configuration conforming generally in shape to that of the furnace to provide a space saving and efficient furnace construction.

Figure 1:
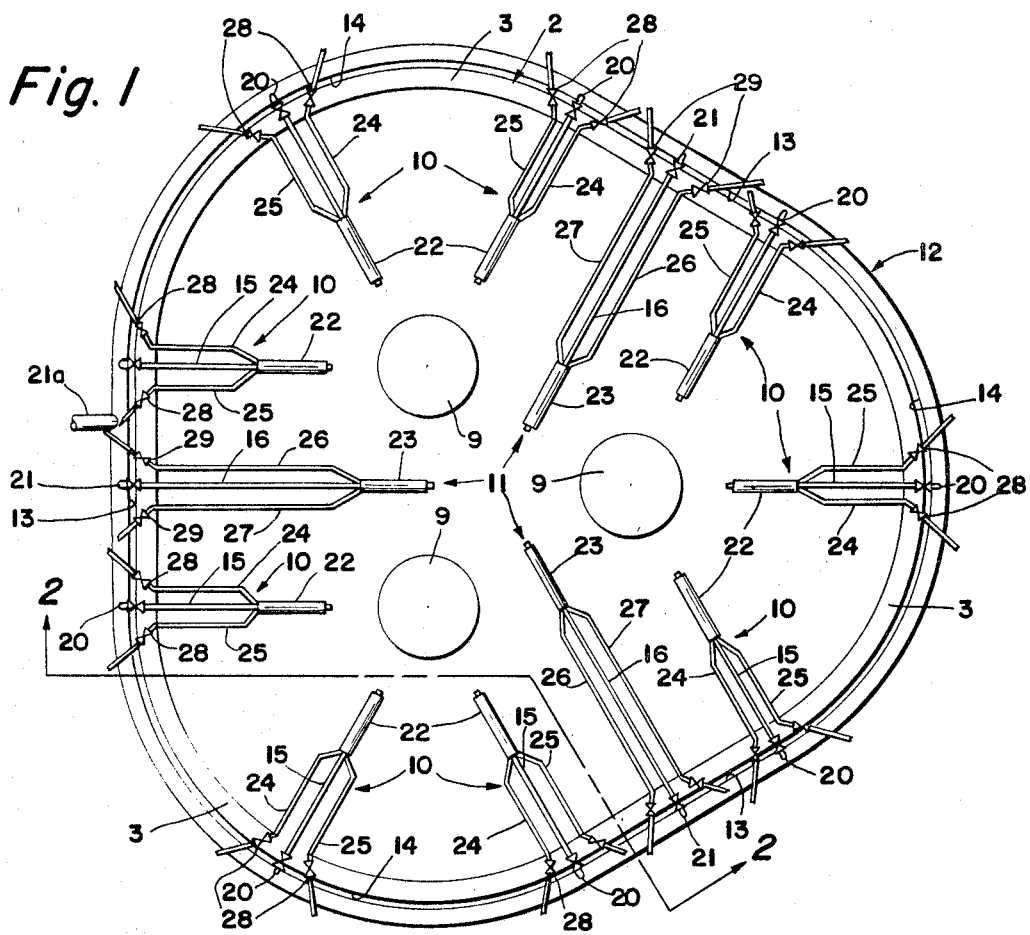
FIG. 1 is a top plan view of one form of the improved electric reduction furnace of the present invention.

As shown in FIG. 1, the series of lances may include a shorter 10 and a longer 11 type lance, nine of which may be arranged in three sets of three. Each set extends from the generally planar portion 13 of the triangularly shaped bustle, and each set includes a longer type lance 11 disposed intermediate two of the shorter type lances 10, with the length of the longer type lance 11 being sufficient to extend between an opposed pair of the aforementioned triangularly disposed electrodes 9. The remaining three shorter type 10 lances, respectively, may be disposed between the respective sets of lances and disposed to extend radially inwardly from the rounded corner portions 14 defined by the triangularly shaped bustle 12 and into close proximity with electrodes 9. By such arrangement, the shorter type lances 10 extend substantially parallel to and in opposite alignment with the associated longer type lance 11 of each of the respective sets. Such selective disposition of the shorter 10 and longer 11 type lances relative to one another and to the triangularly disposed electrodes 9 insures that the oxidizing media will be introduced uniformly throughout the burden and in a manner so as not to localize the heat effects from the electrodes, thereby utilizing the electrical energy input to the furnace to the best advantage.

Except for the relative disparity in length, the respective shorter 10 and longer 11 type lances are preferably of identical construction, and each includes a bent tube-like pipe 15, 16 which extends downwardly at an angle of approximately 45° toward the center of the furnace and to a predetermined depth, such as for example approximately 2½ feet below the surface of the burden. The pipes 15, 16 may be secured to the rim of the furnace by means of a support brackets 17 and may communicate at one end to the bustle 12 by means of flexible conduits 18, 19 and adjustable control valves 20, 21 which regulate the amount of oxidizing media supplied from the bustle. The oxidizing media may be supplied to the bustle 12 through a main supply pipe 21a which communicates therewith (FIG. 1) and with a source of supply (not shown).

The other or bent end of each pipe 15, 16 may be provided with an elongated refractory sleeve 22, 23 which may be removably attached thereto and which is adapted to extend below the surface of the burden. The sleeves 22, 23 may be of a cylindrical elongated construction, each of which is provided at one end with a pair of conduits 24–27 which communicate with a source of cooling media (not shown), such as air, water, or the like, which provides a continuous circulation of coolant to insulate the discharge end of the pipes 15, 16 against the heat effects of the furnace. Suitable control valves 28, 29 may be provided in each of the respective conduits 24–27 for regulating the flow of coolant to the sleeves.

Figure 3:
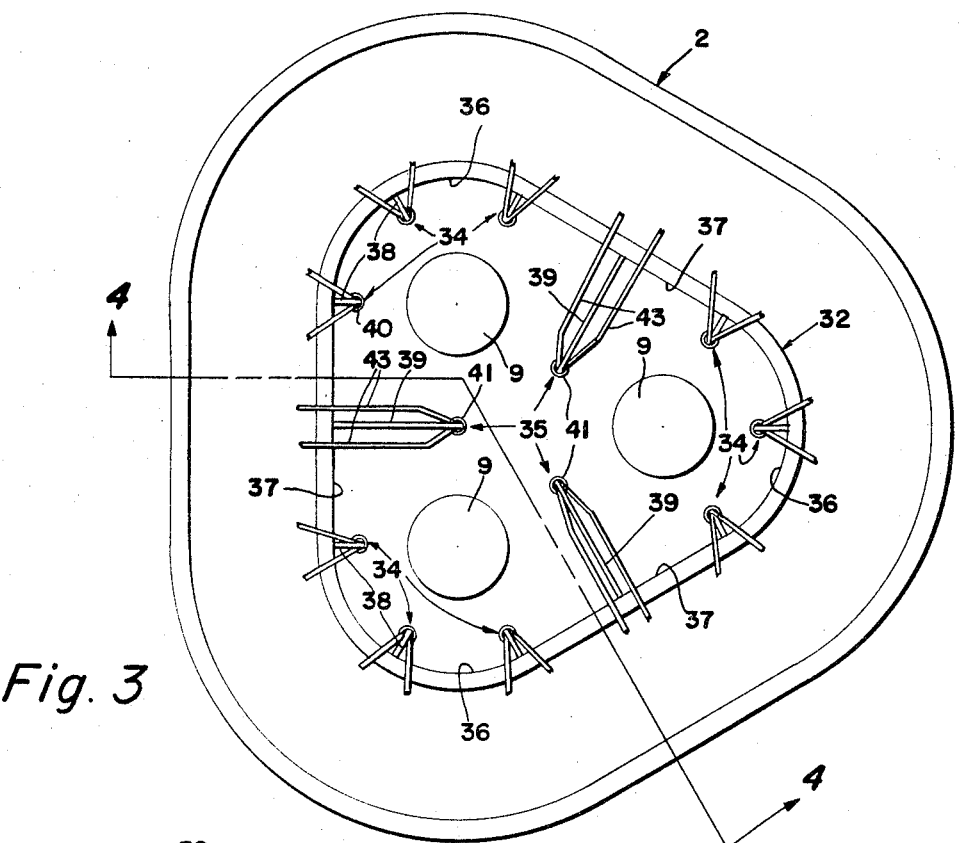
FIG. 3 is a top plan view of another form of the electric reduction furnace of the present invention.
Figure 4:
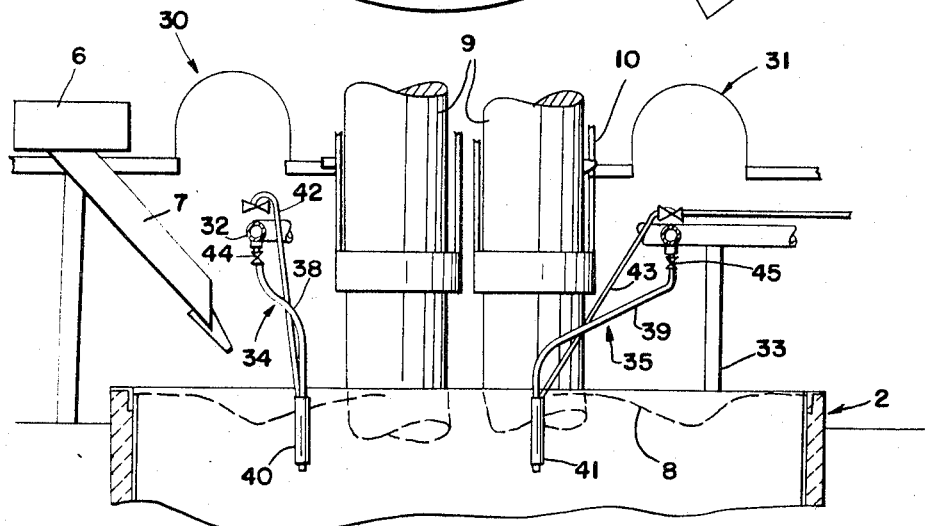
FIG. 4 is a fragmentary cross-section view taken along the plane of line 4—4 of FIG. 3.

As shown in FIGS. 3 and 4, electric reduction furnace, designated generally at 30, may be of a similar construction to that above discussed in connection with FIGS. 1 and 2, but is shown as including a portion of a conventional type electrical buss and buss bar arrangement 31 for conducting electrical energy to the electrodes 9. In this form, however, the bustle 32 is of the same general triangularly configuration as that aforementioned, but may be of a substantially lesser peripheral dimension as compared to the outer peripheral dimension of the furnace shell 2. Furthermore, rather than being supported adjacent the rim of the furnace, the bustle 32 may be spaced above the rim thereof by means of support brackets 33, so as to encircle the electrodes 9 approximately adjacent the bottom of the electrode holders 10.

In this modified form of the invention, the oxidizing media may be introduced below the surface of the burden 8 by means of another series of twelve lances 34, 35 which extend downwardly from the bustle 32 and into the furnace. The lances may be of the same vertical height (FIG. 4) so as to extend to a predetermined depth, such as for example, to approximately 2½ feet below the surface of the burden. Here, the series of the twelve lances 34, 35 includes three sets of three lances 34, each set of which extends from a rounded or curved portion 36 of the triangularly shaped bustle 32. The remaining three lances 35 are alternately disposed relative to the aforementioned sets of lances 34 and extend from the planar or flat portion 37 of the triangularly shaped bustle 32 and inwardly intermediate an opposed pair of the triangularly disposed electrodes 9 (FIG. 3).

Here again, the individual lances 34, 35 are of a generally identical construction, each of which includes a bent pipe 38, 39 connected at one end to the bustle 32 and provided at its other end with the aforementioned type of refractory, heat insulated sleeve 40, 41. A coolant may be circulated through the respective sleeves by means of conduits 42, 43 which communicate with a source of supply to insulate the lances against the heat effects of the furnace. Suitable valves 44, 45 may be provided intermediate the bustle 32 and pipes 38, 39 to regulate the amount of oxidizing media supplied to the furnace.

In still another modified form is shown in FIGS. 5 and 6, the bustle 46 may be secured to the outer surface of the shell 2 slightly below the rim of the furnace 47. Here, the oxidizing media is preferably introduced below the surface of the burden 8 by means of another series of twelve lances 48, 49, which communicate with the bustle 46 and which extend generally horizontally and to a predetermined depth, such as for example about two feet, below the surface of the burden. As shown in FIG. 5, the series of lances may again include shorter 48 and longer 49 type lances, nine of which may be arranged in three sets of three so that each set extends from the planar or flat portion 50 of the bustle 46. Each set of three lances includes a longer 49 type lance disposed intermediate two of the shorter 48 type lances and each longer type of lance 49 is of a length sufficient to extend generally intermediate and opposed pair of the triangularly disposed electrodes 9. The remaining three shorter type lances 48 may be alternately disposed relative to the aforementioned sets of lances and may extend radially inwardly from the rounded corner portions 51 of the bustle 46 and into close proximity with the electrodes 9, such that each of the remaining shorter type lances 48 is disposed to extend opposite to and in parallel alignment with the longer type lance 49 of each set of lances for the purposes, as aforementioned.

In this form, the individual lances 48, 49 are also of a generally identical construction, each of which includes a tube-like pipe 52, 53 disposed to extend horizontally through openings 54, 55 provided in the sides, of the furnace. The pipes 52, 53 communicate at one end with the bustle 46 by means of suitable valves 56, 57 which regulate the amount of oxidizing media supplied from the bustle. The pipes may be provided at their other ends with similar refractory, heat-insulated sleeves 58, 59, but in this form the sleeves 58, 59 may be coextensive in length with that portion of the pipes which extends interiorly of the furnace so as to completely encompass exposed portions thereof against the heat effects of the furnace. Suitable conduits 60, 61 may again be provided to circulate a coolant around the sleeves 58, 59 from a suitable source of supply (not shown).

Through the electric reduction furnace and oxidizing media injection construction of FIGS. 1 to 6 have been illustrated as being of a particular triangularly shaped configuration, it is to be understood that other structurally shaped configurations, such as circular, polygonal (regular or irregular) and that other such configurations may also be utilized to achieve equally satisfactory results in accordance with the present invention.

In operation of the electric furnace construction of FIGS. 1 to 6 and with reference to FIG. 7, which diagrammatically illustrates the disposition of the furnace burden during reduction, a charge of the aforementioned composition may be introduced through the top and into the shaft of the furnace. As shown, the furnace may be provided with a removable cover 62 (FIG. 7) to collect the gases within the furnace and to prevent any loss of furnace gases to the atmosphere in the working area. The cover 62 may be provided with suitable vents or exhaust ducts (not shown) to release the unburned combustion gases from the furnace. The heating means, such as electrodes 9, may then be energized to perform the necessary oxidation and reduction of the burden wherein a layer of molten metal alloy A and impurities in the form of a slag layer B are produced in the bottom of the furnace. During such reduction, gaseous reaction products, such as carbon monoxide, rise up from the lower layers through the smelting zone C so as to be dispursed between the interstices of the unreduced burden, designated generally at D. An oxidizing media, such as oxygen, may then be injected into the burden D, but above the smelting zone C, through the selectively disposed lances (broken line showing at 10, 11, 34, 35, 48 and 49). The depth of immersion of the lances below the surface of the burden being predetermined in each case so as to achieve the most economical and efficient reaction between the molten alloy, oxidizing media, lime and ore. As the combustion of the oxidizing media is highly exothermic, the carbon monoxide gases contained within the intertices of the burden are quickly burned-off and the potential heat energy otherwise wasted to the atmosphere is entrained within the burden and dissipated immediately in the form of heat to bring the temperature of the burden more rapidly to an optimum for further reduction of the charge. Moreover, in a continuous reduction operation, the temperature of the metal alloy can be controlled within predetermined limits by the rate of charge additions to the furnace and by the rate of injection of oxidizing media into the burden. Upon completion of the reduction, the metal alloy is tapped from the furnace and cast into molds in a conventional manner, as known in the arts.

As applied to reduction in the blast furnace and as diagrammatically illustrated at FIG. 8, the charge which includes a mixture of ore, coke, and flux is introduced through an opening (not shown) in the top and into the stack 63 of the furnace 64. At the same time, heated air from conventional type stoves (not shown) is blown into the tuyeres 65 at the bottom of the furnace, forming furnace gases, such as carbon monoxide, which pass through the smelting zone C' of the bosh 66 and up through voids in the burden D', and which reduced the descending ore to produce a layer of molten pig iron A' and slag B' at the bottom of the furnace. The layers of pig iron and slag are tapped from the furnace through the tapping hole 67 and cinder notch 68, respectively, upon completion of reduction. Commensurate with reduction and in accordance with the present invention, an oxidizing media, such as oxygen, may be injected into the burden/D', but above the smelting zone C', through a plurality of the aforementioned type of lances (broken line showing at 69) which extend through the side wall of the stack 63 and to a predetermined depth below the surface of the burden, as aforesaid. Here again, the number and relative disposition of the injection lances within the stack is predetermined to achieve the most effective reaction between the pig iron, oxidizing media, lime and ore. Accordingly, with such selective injection of the oxidizing media, the carbon monoxide gases contained within the interstices of the burden are quickly burned-off and immediately dissipated in the form of heat to bring the temperature of the furnace to an optimum for further reduction of the ore to pig iron.

Though the blast furnace reduction of FIG. 8 has been illustrated in the production of pig iron, it is to be understood that other iron bearing products, such as silvery pig iron, ferromaganese, spiegeleisen and like, may also be produced by such blast furnace reduction and with equally beneficial results in accord with the principles of the present invention.

From the foregoing description and accompanying drawings, it will be seen that the present invention embodies an improved method and apparatus for producing ferro alloys, calcium carbide, calcium silicide, pig iron, silvery pig iron, spiegeleisen and the like, in reduction type furnaces, such as in the electric furnace and/or blast furnace, which provides substantial advantages over the conventional type facilities and processes. In electric furnace reduction, the uniform introduction of an oxidizing media, such as oxygen, to a predetermined depth below the surface of the burden, but above the smelting zone, causes the heat values from the gaseous reaction products to be substantially dissipated within the burden which provides a substantial reduction in heat energy required to be supplied from other electrical power sources or any such other type of heat source. Moreover, such process substantially minimizes the operational cost of the furnace in tons per unit of electrical energy supplied thereto and provides a far greater flexibility in electric furnace reduction than has heretofore been obtained by conventional processes. Similarly, and as applied to blast furnace reduction, the present invention provides a greater and more efficient utilization of the furnace gases for purposes of reduction. Thus, for a given introduction of oxidizing media below the surface of the burden, but above the smelting zone, there is achieved a chemical balance within the furnace which minimizes loss of furnace gases and which provides a substantial reduction in the coke requirements per ton of pig iron produced. Furthermore, the present invention provides an improved arrangement for carrying out such method at any conventional type reduction furnace, such as in the electric reduction furnace and/or in the blast furnace, which is of a far more simple and economical construction compared to existent conventional type reduction furnace facilities requiring special equipment and/or apparatus for recovering heat values from the furnace gases.

The terms and expressions which have been used herein are terms of description and not of limitation, and there is no intention in the use of such terms and/or expressions of excluding any equivalents of the features shown and described or portions thereof, but it is recognized that various modifications are possible within the scope of the invention claimed.

I claim:

1. In an electrical arc reduction furnace having a smelting zone comprising, a generally polygonal shell for receiving a charge therein, a plurality of symmetrically spaced electrodes extending into said shell and for reducing the charge within said shell, a plurality of symmetrically arranged sets of heat-resistant, lance-like members for transmitting an oxidizing media uniformly throughout the charge and into said shell, a bustle pipe disposed adjacent the top of said shell for transmitting an oxidizing media from a source of supply, said lance-like members communicating at one end with said bustle pipe and projecting toward the other ends into the interior of said shell uniformly with respect to the electrodes and being of sufficient length to extend a predetermined distance below the surface but above the smelting zone of the charge to be reduced within said furnace, and at least one of the lance-like members of each of the respective sets being disposed to project interiorly of said shell a greater distance than the other of said lance-like members and intermediate opposed pairs of electrodes for distributing oxidizing media uniformly within said shell.

2. In an electric furnace in accordance with claim 1 including at least one lance-like member disposed between the respective sets of lance-like members and extending into proximity with said electrodes.

3. In an electric reduction furnace in accordance with claim 1, wherein there are three triangularly arranged electrodes extending generally vertically into said shell, and there being three sets of triangularly arranged lance-like members extending into close proximity with said electrodes.

4. In an electric arc reduction furnace according to claim 1, wherein said shell is generally triangular in configuration, and the configuration of said bustle conforms substantially to the configuration of said shell.

5. In a reduction furnace in accordance with claim 1, wherein the interior end of said lance-like members extends downwardly and inwardly at an angle of 45° relative to the vertical axis of said shell.

6. In an electric arc reduction furnace in accordance with claim 1, wherein the interior end of said lance-like members extends generally vertically downwardly into said shell.

7. In an electric arc reduction furnace in accordance with claim 1, wherein the interior end of said lance-like members extends generally horizontally interiorly of said shell.

8. In an electric arc reduction furnace in accordance with claim 1, wherein the extension of a generally vertically extending plane defined by said greater extending lance-like members intersects at the geometric center of said shell.

9. In an electric arc reduction furnace in accordance with claim 8, wherein the extension of a generally vertical plane defined by said other lance-like members of each set intersects at the geometric center of a respective one of said electrodes.

10. In an electric arc reduction furnace in accordance with claim 1, wherein said shell is substantially open adjacent its upper end.

11. In an electrical arc reduction furnace in accordance with claim 10 and wherein the bustle is disposed above the open end of said shell.

12. In an electric arc reduction furnace in accordance with claim 1, wherein the innermost ends of said greater extending lance-like members are spaced substantially equidistant from one another.

13. In an electric arc reduction furnace in accordance with claim 1, wherein the innermost ends of said other lance-like members are spaced substantially equidistant from the geometric center of a respective one of said electrodes.

14. In an electric arc reduction furnace having a smelting zone and comprising, a generally polygonal shell for receiving a charge therein, a plurality of electrically spaced electrodes extending into said shell for reducing a charge within said shell, a plurality of symmetrically arranged sets of heat-resistant lance-like members for transmitting an oxidizing media uniformly throughout the charge and into said shell, a bustle pipe disposed adjacent the top of said shell for transmitting an oxidizing media from a source of supply, said lance-like members communicating at one end with said bustle pipe and projecting toward the other end into the interior of said shell and being of sufficient length to extend a predetermined distance below the surface but above the smelting zone of the charge to be reduced within said furnace, at least one of the lance-like members of each of the respective sets being disposed to project interiorly of said shell a greater distance than the other of said lance-like members and intermediate opposed pairs of electrodes for distributing oxidizing media uniformly within said shell, at least one lance-like member disposed between the respective sets of lance-like members and extending into proximity with said electrodes, the extension of a generally vertically extending plane defined by said greater extending lance-like members being disposed to intersect at the geometric center of said shell, the extension of a generally vertically extending plane defined by said other lance-like members of each set being disposed to intersect at the geometric center of the respective one of said electrodes, the innermost ends of said greater extending lance-like members being spaced substantially equidistant from one another and a respective one of said electrodes, and the innermost ends of said other lance-like members being spaced substanially equidistant from the geometric center of a respective one of said electrodes.

References Cited

UNITED STATES PATENTS

| | | | |
|---|---|---|---|
| 1,497,173 | 6/1924 | Hechenbleikner | 13—9 X |
| 1,674,982 | 6/1928 | Moore | 13—9 X |
| 1,952,927 | 3/1934 | Langmuir | 13—2 |
| 2,058,494 | 10/1936 | Ostrofsky | 75—11 |
| 2,767,080 | 10/1956 | Wiberg | 75—11 X |
| 2,795,497 | 6/1957 | Elvander | 75—41 |
| 2,868,860 | 1/1959 | Foyn et al. | 13—9 |
| 3,167,420 | 1/1965 | Robiette | 13—9 X |
| 1,242,442 | 10/1917 | Humbert | 75—11 |

OTHER REFERENCES

The Iron Age, June 2, 1949, TS 200.I8, p. 69.

WILLIAM J. STEPHENSON, *Primary Examiner.*

R. S. ANNEAR, *Assistant Examiner.*

U.S. Cl. X.R.

13—9